United States Patent [19]

Jesena

[11] Patent Number: 4,718,295
[45] Date of Patent: Jan. 12, 1988

[54] FREE-WHEELING GEARS FOR A MULTIPLE SPEED TRANSAXLE TRANSMISSION

[75] Inventor: Rhode M. Jesena, Plymouth, Mich.

[73] Assignee: Ford Motor Company, Dearborn, Mich.

[21] Appl. No.: 863,893

[22] Filed: May 16, 1986

[51] Int. Cl.[4] .............................................. F16H 3/08
[52] U.S. Cl. ....................................... 74/368; 74/331; 74/359
[58] Field of Search ................. 74/329, 331, 359, 368, 74/339, 358; 192/20, 48.6

[56] References Cited

U.S. PATENT DOCUMENTS

| | | | |
|---|---|---|---|
| 1,969,561 | 8/1934 | Keller | 192/48.6 X |
| 2,039,451 | 5/1936 | Richards | 74/359 X |
| 2,403,378 | 7/1946 | Kilpela | 192/48.6 X |
| 2,567,446 | 9/1951 | Polomski | 74/359 X |
| 2,638,793 | 5/1953 | Winther et al. | 74/331 X |
| 2,959,237 | 11/1960 | Hill | 74/368 X |
| 4,311,062 | 1/1982 | Hamada et al. | 74/359 X |
| 4,377,093 | 3/1983 | Janson | 74/359 X |
| 4,461,188 | 7/1984 | Fisher | 74/331 X |
| 4,538,475 | 9/1985 | Igarashi et al. | 74/368 |

Primary Examiner—Dirk Wright
Attorney, Agent, or Firm—Frank G. McKenzie; Donald J. Harrington

[57] ABSTRACT

A multiple speed ratio power transmission mechanism for an automotive vehicle adapted to be mounted in a transverse position with respect to the fore and aft axis of the vehicle includes a torque input shaft having input gearing fixed thereto. A first countershaft has gearing journalled thereon meshing with the torque input gear and synchronizer clutches adapted to produce a driving connection between the input shaft and the countershaft. A second countershaft has a fifth forward speed gear in meshing engagement with a gear on the input shaft and a synchronizer clutch to produce a driving connection between the input shaft and the second countershaft. A one-way clutch supported on the input shaft produces a one-way driving connection between that shaft and the gear wheel. Rotatably supported on the shaft is a gear that is in continuous meshing engagement with fourth and fifth speed pinions, each pinion carried on one of the countershafts.

5 Claims, 1 Drawing Figure

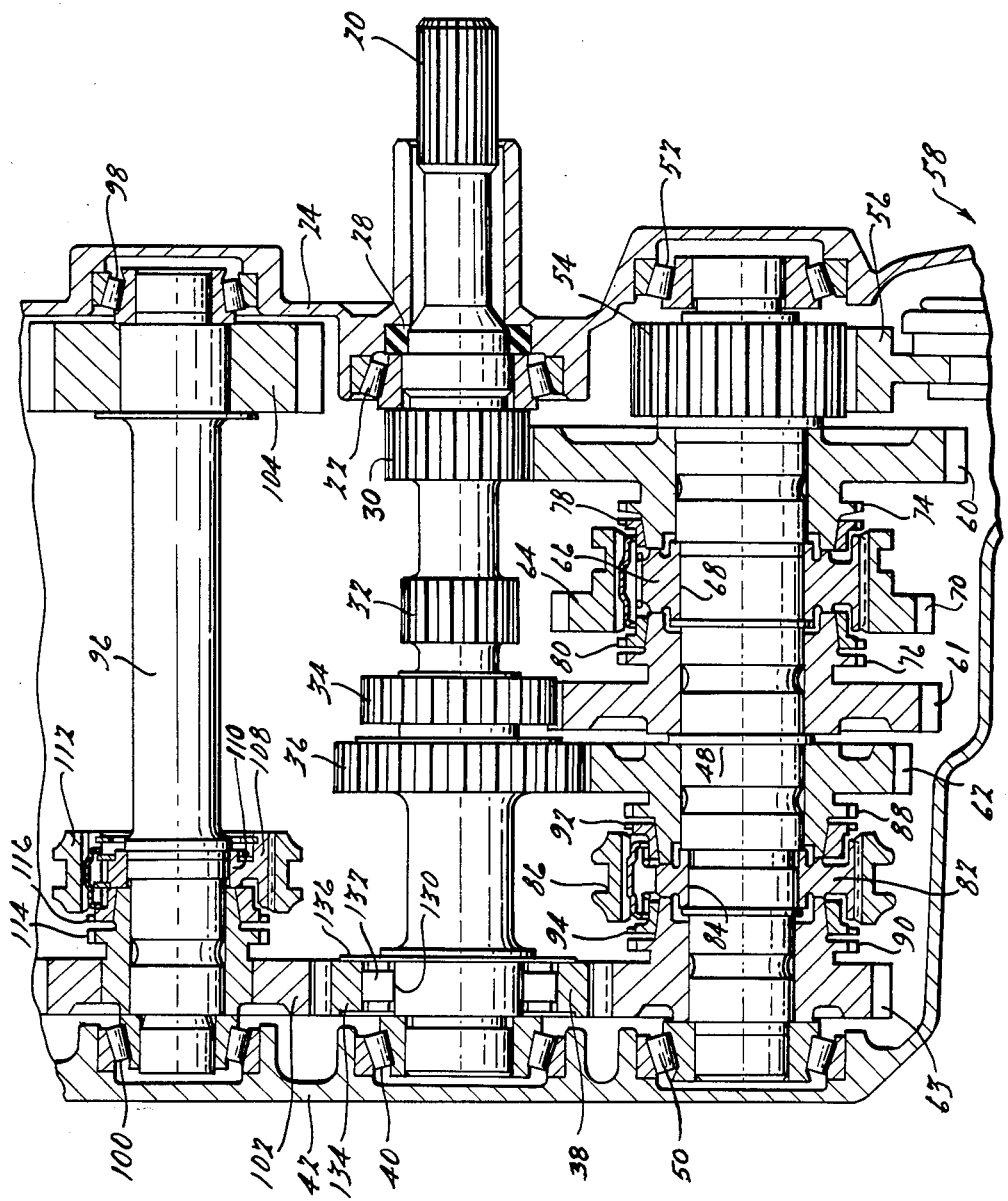

4,718,295

FREE-WHEELING GEARS FOR A MULTIPLE SPEED TRANSAXLE TRANSMISSION

BACKGROUND OF THE INVENTION

1. Field of the Invention

This invention relates generally to an automotive manual transmission and especially to a transmission mechanism that is transversely disposed with respect to the fore-and-aft axis of the vehicle.

2. Description of the Prior Art

When the engine of a motor vehicle is idling and the neutral clutch that connects the engine to a manual transmission is disengaged, the speed of the engine varies as a result of the cyclic irregularity that is intrinsic in the operation of an internal combustion engine. Countershaft manual transmissions for automotive use contain gearsets whose members are in continuous meshing engagement, though the gear selector to the transmission is in the neutral position. When the neutral clutch is engaged and the gear selector is in the neutral position, the speed changes of the engine transmitted to the gearset produce noise called gear rattle. When the engaged gear teeth change position with respect to each other due to the engine speed variations, the teeth of the driven gear contact alternately the driving face and the non-driving face of the driving pinion.

To reduce or eliminate the objectionable noise that results from this contact, various devices have been employed to take up the clearance between the faces of the gear and the mating pinion. These devices include a wheel coaxial with the gear having similar teeth to those of the gear and means for elastically maintaining the teeth of the gear in a position that is angularly offset relative to the gear. Usually in such devices, a mechanical spring, such as a helical spring, located radially offset from the axis of the gear, applies a force directed tangentially to the axis and tending to rotate the annular element with respect to the gear wheel. Other means than helical springs, such as elastomeric material, have been used in the prior art to bias an annular member angularly with respect to the gear to maintain contact between mating gear teeth in order to avoid gear rattle.

In addition to neutral rollover gear rattle, an additional gear rattle condition is known to occur particularly in fourth of fifth gear ratio operation with the engine under load and operating at a speed that is sufficient low as to cause engine lugging. In these conditions, the torsional vibrations of the engine are exceptionally strong and cause excessive vibration. Within the transmission they cause a rattle or chattering sound to issue from the transmission due to contact being made on opposite faces of engaged gears and pinions.

SUMMARY OF THE INVENTION

In a five speed transaxle embodiment of this invention, one gear wheel supported on the input shaft is continuously engaged with fourth and fifth speed pinions that are carried rotatably on one or the other of two countershafts. Synchronizers carried on this countershaft driveably connect the pinions to the shaft on which they are supported. The output gears at the opposite end of the countershaft are continuously engaged with an output pinion by means of which power is transmitted to the differential mechanism. According to this invention, a one-way clutch is located on the input shaft between a gear wheel and the cylindrical surface of the shaft. The one-way clutch permits a one-way drive connection so that power can be transmitted through the clutch from the input shaft to either of the countershafts when fourth and fifth gear ratios are selected by the vehicle operator. However, a one-way clutch overruns when operating in the fourth or fifth gear ratio when power is transmitted from the wheels of the vehicle by either of the countershafts to the input shaft.

This arrangement permits the engine to slow to the idle speed in fourth and fifth speed ratio engagement whenever the engine is not driving the wheels of the vehicle. When coasting downhill and provided the gear selector is set for operation in the fourth or fifth speed ratio, it has been determined that a transmission operating with this device requires lower shifting efforts especially when downshifting from the fifth to fourth speed ratios and when upshifting from third to fourth and from fourth to fifth speed ratios. This advantage is realized because the input shaft can rotate without rotating the pinion that drives the countershafts. The effect is that the reflected inertia of the gearset is reduced.

Synchronizers used in manual transmissions effectively convert the large inertia of the vehicle to frictional energy that is applied to the gear wheel being driveably connected to the shaft on which it is supported. Vehicle inertia is converted to frictional energy which is used to synchronize the speed of the gear to the speed of the shaft. In a countershaft manual transmission, the amount of shifting effort required to bring the speed of the gear to the speed of the shaft is related to the amount of inertia of the gearset. Where this inertia is high the shifting effort is high. It is desirable to minimize the amount of shifting effort in manual transmissions. Use of a one-way clutch that permits the gears to rotate freely without being associated with the shafts on which they turn will reduce the effective inertia of the gearset that must be slowed by the synchronizer. The vehicle operator can complete the synchronized gearshift with less effort using a transmission that employs the gear mechanism of this invention.

BRIEF DESCRIPTION OF THE DRAWING

The FIG. is a cross section through the axes of input shaft and two countershafts of a manual transmission.

DESCRIPTION OF THE PREFERRED EMBODIMENT

An input shaft 20 is journalled in a bearing 22 located in the support wall 24 of the transmission housing. Shaft seal 28 located in an annular recess formed in the support wall seals the outer periphery of the shaft.

Formed on or carried by the shaft are five torque input gears shown respectively at 30, 32, 34, 36, 38. These gears form a torque delivery path during operation in the low speed ratio, reverse, second speed ratio, third speed ratio and the fourth and fifth speed ratios, respectively. The drive gear 38 operates to provide a portion of the torque delivery path for the fifth speed ratio. The left end of the input shaft is supported by bearing 40 in an opening formed in the end wall 42 of the housing.

A countershaft 48 is supported at one axial end by the bearing 50, which is received in a recess form in the wall of the housing. The opposite end of the countershaft is supported in a bearing 52, which is received in a recess formed in the support wall 24. A torque output gear 54 is fixed to or integrally formed with countershaft 48 and meshes with output gear 56, which drives the differential gear assembly designated generally by the reference character 58. Countershaft 48 supports output gears 60–63, each of which forms a part of the torque delivery paths for low speed ratio, second speed ratio, third speed ratio and fourth speed ratio. The output gears 60–63 are journalled on the outer surface of countershaft 48.

A sleeve gear 64 carried by a synchronizer hub 66, is splined at 68 to the countershaft 48. The reverse output gear 70 is splined to the outer surface of synchronizer hub 66 and is adapted to slide axially on the outer surface of the hub. A reverse drive idler is rotatably supported for axial movement on a reverse pinion shaft. sleeve 64, which forms a part of the reverse torque delivery path, has internal clutch teeth which are continuously engaged with the clutch teeth on the outer surface of hub 66 and are adapted to engage external clutch teeth 74, 76 formed respectively on the output gears 60 and 61. Synchronizer rings 78, 80 act in a known fashion to synchronize the rotary motion of the clutch teeth on sleeve 64 selectively with the external clutch teeth 74, 76 on gears 60, 61, depending upon the direction the reverse gear is shifted axially.

When the reverse output gear is in the central position as shown in the figure and when the reverse idler is shifted to the left-hand position the reverse idler is brought into engagement with the reverse input gear 32 and with reverse output gear 64, thereby completing a reverse torque delivery path between the input shaft 20 and the output gear 54. When operating the transmission at any ratio except the reverse ratio, the reverse idler assumes the position at the right-hand end of its support shaft. When sleeve 64 is shifted in the left-hand direction, the clutch teeth 76 on the output gear 61 engage with the internal clutch teeth of the sleeve 64, thereby establishing a driving connection between the countershaft 48 and output gear 61. The synchronizer clutch ring 80 establishes speed synchronism before the clutching engagement.

A three-four synchronizer clutch hub 82 is splined at 84 to countershaft 48 and has external splines on which the internal splines of synchronizer clutch sleeve 86 is slideably mounted. Sleeve 86 has internal clutch teeth that are adapted to engage external clutch teeth 88, 90 formed respectively on output gears 62 and 63. In the conventional way, synchronizer clutch rings 92, 94 are positioned between the synchronizer clutch hub 82 and the output gear 62 and 63 to establish synchronism between countershaft 48 and selectively with output gear 62 or 63, depending upon the direction in which the synchronizer clutch sleeve 86 is moved.

An auxiliary countershaft 96 is supported at one axial end on bearing 98, which is received in a recess formed at the end wall 24, and at the opposite axial end by bearing 100, which is received in a recess in the end wall 42. A fifth speed ratio input gear 102 is journalled on the outer surface of the auxiliary countershaft 96 and is in continuous meshing engagement with input gear 38 and output gear 63. At the opposite axial end of the auxiliary countershaft, the fifth speed ratio drive pinion 104 formed integrally with countershaft 96 or connected thereto by splines, is in continuous meshing engagement with output gear 56 of the differential assembly.

Located between the fifth speed ratio gear 102 and the fifth speed ratio pinion 104 is a third synchronizer clutch hub 108 splined at 110 to the countershaft 96. Hub 108 has external splines on which an internally splined synchronizer clutch sleeve 112 is mounted. Sleeve 112 is formed with internal clutch teeth that are adapted to engage continuously the teeth on the outer surface of the hub and to engage selectively external clutch teeth 114 formed on the fifth speed input gear 102. The synchronizer clutch 116 is located between clutch teeth 114 and the synchronizer hub 108 to establish synchronism between the auxiliary countershaft and gear 102.

U.S. Pat. No. 4,377,093 describes the differential gear assembly that is driven by output shaft 56. The entire disclosure of that patent is incorporated herein by reference.

The input cluster shaft 20 is formed with a cylindrical surface 130, which is aligned axially with gear wheel 38. Located between surface 130 and the inside diameter of gear wheel 38 is a one-way clutch 132. The outside diameter of the cluster shaft provides the inner bearing race for the clutch, and the inside diameter of gear wheel 38 provides the outer race for the one-way clutch. Two flat disks, 134, 136 are fitted within recesses located in the cluster shaft and extend radially outward sufficiently therefrom to hold the gear wheel 38 in place and to retain the one-way clutch in position on the cluster shaft. The disks also operate to absorb the thrust load produced by the torque that is transmitted between the bevel gear surfaces on gear wheel 38 and the bevel gear surfaces on pinions 63 and 102.

The transmission is conditioned for first speed ratio operation by positioning the sleeve 64 at the right-hand extremity of its travel and synchronizer sleeve 86 and 112 in their neutral positions. The sleeve 64 carried by the hub 66 of the one-two synchronizer is moved to the right to establish clutching engagement between the countershaft and gear 60. The torque delivery path includes the input shaft 20, the first speed ratio input gear 30, the output gear 60, pinion 54 and output gear 56.

The second speed ratio operation is produced when the reverse idler is placed in the neutral position out of engagement with reverse gear 32 and synchronizer sleeves 86, 112 are in their neutral positions. Then one-two synchronizer sleeve 64 is shifted to the left and into engagement with the external clutch teeth 76 on gear 61. This torque delivery path includes input shaft 20, input gear 34, output gear 61, countershaft 48, output pinion 54 and output gear 56.

For the third speed ratio operation, the reverse idler is again located in the neutral position out of engagement with the reverse input gear 32 and the synchronizer sleeves 64, 112 are in their neutral positions. Then the three-four synchronizer clutch sleeve 86 is shifted to the right into driving engagement with the external clutch teeth 88 formed on gear 62. This fixes gear 62 to countershaft 48. The torque delivery path for third speed ratio operation includes input shaft 20, input gear 36, third speed ratio output gear 62, countershaft 48, output pinion 54 and output gear 56.

The fourth speed ratio occurs when the reverse idler is in its neutral position disengaged from reverse gear 32 and the one-two clutch sleeve 64 and sleeve 112 are in their neutral positions. The three-four synchronizer clutch sleeve 86 is shifted to the left into engagement with clutch teeth 90. The torque delivery path for the fourth speed ratio includes input shaft 20, input gear 38, output gear 63, countershaft 48, output pinion 54 and output gear 56.

The fifth forward speed ratio operation, which is preferably an overdrive condition, is produced when the reverse idler, the one-two synchronizer sleeve and the three-four synchronizer clutch sleeve 86 are located in their neutral positions. Then clutch sleeve 112 is moved leftward into engagement with the clutch teeth 114 on the fifth speed output gear 102. This connects gear 102 to countershaft 96. The torque delivery path for the fifth speed ratio operation includes input shaft 20, input gear 38, fifth speed output gear 102, auxiliary countershaft 96, fifth speed pinion 104 and output gear 56.

When power is transmitted to the input shaft, either through countershaft 48 or auxiliary countershaft 96, the one-way clutch 132 transmits power from the cluster shaft 20 to gear wheel 38. However, when the transmission is set for operation in the fourth or fifth gear ratio and power is transmitted from either countershaft 48 or auxiliary countershaft 96 to the input shaft, then one-way clutch 132 overruns and driveably disengages gear wheel 38 from shaft 20, thereby permitting pinions 63 and 102 to become driveably disconnected from the input shaft 20. When this occurs, the engine speed can slow to the idle speed regardless of the vehicle speed because the wheels of the vehicle are driveably disconnected from the engine shaft, which is clutched to input shaft 20.

Having described the preferred embodiment of my invention, what I claim and desire to secure by U.S. Letters Patent is:

1. In a power transmission for driveably connecting the drive wheels of a motor vehicle to an engine, a drive mechanism comprising:
   an input shaft driveably connectable to an engine having a first pinion supported thereon;
   a first countershaft rotatably supported and aligned substantially parallel to the input shaft;
   a first gear carried on the first countershaft in continuous meshing engagement with the pinion, driveably connectable selectively to the first countershaft;
   a second countershaft rotatably supported and aligned substantially parallel to the input shaft;
   a second gear carried on the second countershaft in continuous meshing engagement with the pinion, driveably connectable selectively to the second countershaft;
   clutch means carried on the input shaft for providing a one-way driveable connection between the pinion and the input shaft.

2. The drive mechanism of claim 1 further comprising output gearing driveably connecting the first countershaft and second countershaft to the drive wheels.

3. The drive mechanism of claim 1 further comprising synchronizer clutch means carried by the first countershaft and second countershaft for driveably connecting the first gear and second gear to the respective countershaft.

4. The drive mechanism of claim 1 wherein the clutch means driveably connects the first gear and second gear to the pinion when power is transmitted from the input shaft to the first countershaft or the second countershaft and driveably disconnects the first gear and second gear from the pinion when power is transmitted from the first countershaft or the second countershaft to the input shaft.

5. The drive mechanism of claim 1 further comprising gearing means defining multiple torque delivery paths including multiple pairs of gears carried by said input shaft and said first countershaft for producing multiple drive ratios of the speed of the countershafts to the speed of the input shaft and wherein the clutch means is located in the torque delivery path that produce the highest and second highest speed ratios of the gearing means.

* * * * *